US012746625B2

(12) United States Patent
Wynter et al.

(10) Patent No.: US 12,746,625 B2
(45) Date of Patent: Sep. 29, 2026

(54) MULTI-RESOLUTION AUDIO DEFECT DETECTION IN WELDING

(71) Applicant: INTERNATIONAL BUSINESS MACHINES CORPORATION, Armonk, NY (US)

(72) Inventors: Laura Wynter, Singapore (SG); Penny Chong, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 18/500,333

(22) Filed: Nov. 2, 2023

(65) Prior Publication Data

US 2025/0144748 A1 May 8, 2025

(51) Int. Cl.
*B23K 31/12* (2006.01)
*G10L 21/10* (2013.01)
*G10L 25/27* (2013.01)

(52) U.S. Cl.
CPC ............ *B23K 31/125* (2013.01); *G10L 21/10* (2013.01); *G10L 25/27* (2013.01)

(58) Field of Classification Search
CPC ........ G10L 25/27; G10L 21/10; B23K 31/125
USPC ............................................................ 702/35
See application file for complete search history.

(56) References Cited

U.S. PATENT DOCUMENTS 12,517,095 B2 * 1/2026 Leger ..................... G01N 29/14

FOREIGN PATENT DOCUMENTS

CN 114714022 A 7/2022
CN 115439463 A 12/2022

OTHER PUBLICATIONS

Chong, et al., "Masked Spectrogram Prediction for Self-Supervised Audio Pre-Training," Interspeech 2022, Apr. 27, 2022, 5 pages, DOI: 10.48550/arXiv.2204.12768, Retrieved from the Internet: <URL: https://arxiv.org/abs/2204.12768>.

Gong, et al., "SSAST: Self-Supervised Audio Spectrogram Transformer," Association for the Advancement of Artificial Intelligence, Feb. 10, 2022, arXiv:2110.09784v2, DOI: 10.48550/arXiv.2110.09784, Retrieved from the Internet: <URL: https://arxiv.org/abs/2110.09784>.

Huang, et al., "Masked Autoencoders that Listen," 36th Conference on Neural Information Processing Systems (NeurIPS 2022), Jan. 12, 2023, 20 pages, arXiv:2207.06405v3, DOI: 10.48550/arXiv.2207.06405, Retrieved from the Internet: <URL: https://arxiv.org/abs/2207.06405>.

(Continued)

*Primary Examiner* — Aditya S Bhat
(74) *Attorney, Agent, or Firm* — Kelsey M. Skodje

(57) ABSTRACT

According to at least one embodiment, a method, a computer system, and a computer program product for multi-resolution audio defect detection in welding is provided. The present invention may include receiving unlabeled and labeled audio data; formatting the received unlabeled and labeled audio data; training a foundation model using the formatted unlabeled audio data in a self-supervised manner with a reconstruction loss; training the foundation model using the formatted labeled audio data with a classification loss; and performing multi-resolution audio defect detection on welding audio data using the trained foundation model.

20 Claims, 5 Drawing Sheets

(56) References Cited

OTHER PUBLICATIONS

Ji, et al., "Deep Learning-Empowered Digital Twin Using Acoustic Signal for Welding Quality Inspection," Sensors [journal article], 2023 [accessed on Sep. 11, 2023], 20 pages, vol. 23, No. 5, Article 2643, DOI: 10.3390/s23052643, Retrieved from the Internet: <URL: https://www.mdpi.com/1424-8220/23/5/2643>.
Liu, et al., "Learning the Spectrogram Temporal Resolution for Audio Classification," arXiv [under review], Oct. 5, 2022, 18 pages, arXiv:2210.01719v2, DOI: 10.48550/arXiv.2210.01719, Retrieved from the Internet: <URL: https://arxiv.org/abs/2210.01719>.

* cited by examiner

MULTI-RESOLUTION AUDIO DEFECT DETECTION IN WELDING

BACKGROUND

The present invention relates generally to the field of artificial intelligence, in particular, to machine learning.

Metal-to-metal welding is a key component of consumer and industrial products. During the welding process, numerous defects can occur. The detection of welding defects is important for manufacturing companies, as a defect in one or more products can lead to costly product recalls. Detection of welding defects is primarily performed by human inspection of random samples on a product line. However, to increase efficiency, companies are turning to artificial intelligence ("AI")-based quality inspection to detect welding defects.

SUMMARY

Embodiments of a method, a computer system, and a computer program product for multi-resolution audio defect detection are described. According to one embodiment, a method, computer system, and computer program product for training a foundation model using unlabeled audio data, fine-tuning the foundation model using a limited amount of labeled audio data, and determining welding defects comprised within welding audio data using the trained foundation model is provided. An embodiment of the present invention may include receiving unlabeled and labeled audio data. An embodiment of the present invention may include formatting the received unlabeled and labeled audio data. An embodiment of the present invention may include training a foundation model using the formatted unlabeled audio data in a self-supervised manner with a reconstruction loss. An embodiment of the present invention may include training the foundation model using the formatted labeled audio data with a classification loss. An embodiment of the present invention may include performing multi-resolution audio defect detection on welding audio data using the trained foundation model.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
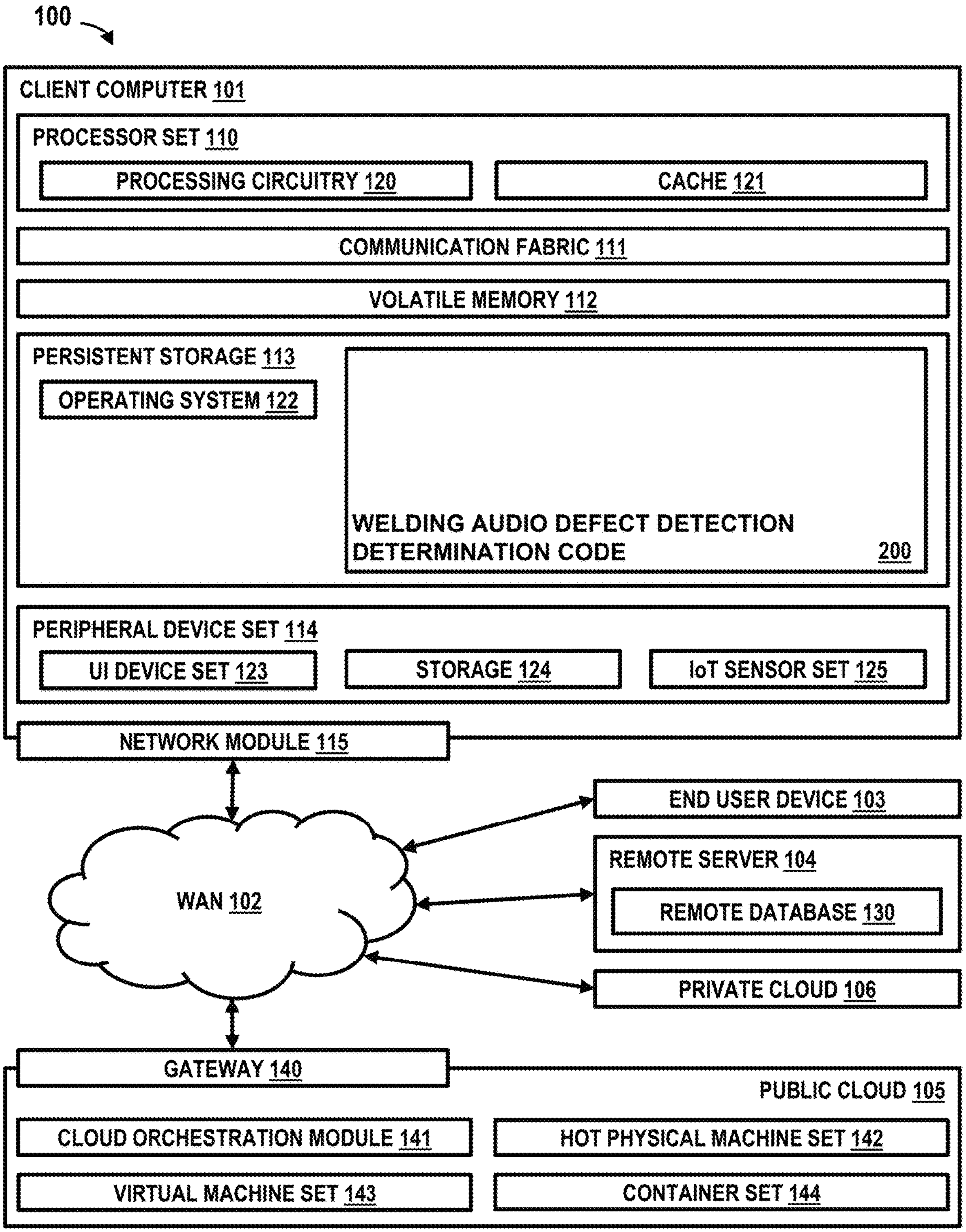
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate generally to the field of artificial intelligence, in particular, to machine learning models. The following described exemplary embodiments provide a method, computer system, and computer program product to, among other things, train a foundation model using unlabeled audio data, fine-tune the foundation model using a limited amount of labeled audio data, and determine welding defects comprised within welding audio data using the trained foundation model. Therefore, according to an aspect of the invention, the present embodiment has the capacity to improve machine learning models and welding defect audio detection by receiving unlabeled and labeled audio data, formatting the received unlabeled and labeled audio data, training a foundation model using the formatted unlabeled audio data in a self-supervised manner with a reconstruction loss, training the foundation model using the formatted labeled audio data with a classification loss, and performing multi-resolution audio defect detection on welding audio data using the trained foundation model. Such an embodiment can improve the detection of welding defects in audio data of welding processes using trained machine learning models.

In embodiments, the formatting of the received audio data may comprise learning importance scores for timeframe and frequency patches of the unlabeled audio data, and masking one or more patches randomly or based on their importance scores. Such an embodiment may improve self-supervised pretraining and training of a machine learning model using unlabeled and labeled data.

In embodiments, the training of the foundation model may comprise inputting coarse-grained masked Mel spectrograms and fine-grained masked Mel spectrograms into the foundation model. Such an embodiment may improve the learning of the grammar of the welding audio data.

In embodiments, the formatting of the received audio data may comprise generating both coarse-grained Mel spectrograms and fine-grained Mel spectrograms. Such an embodiment may improve the visibility of welding defects in the audio data.

In embodiments, the performing of the multi-resolution audio defect detection on the welding audio data using the trained foundation model may comprise determining if one or more welding defects are present in the welding audio data. Such an embodiment may improve the detection of welding defects in received audio data of welding processes.

In embodiments, the formatting of the received audio data may comprise generating an importance binary mask using the learned importance patch scores and applying the importance binary mask on a Mel spectrogram to obtain a masked Mel spectrogram. Such an embodiment may improve the reliability of the 2D patch masking process.

In embodiments, the formatting of the received audio data may comprise randomly masking the fine-grained Mel spectrograms. Such an embodiment may improve the determination of higher-emphasized regions in the welding audio.

An exemplary use of the invention may involve the trained foundation model detecting visible welding defects, such as spatter and burn-through, in received audio of welding processes.

An exemplary use of the invention may involve the trained foundation model detecting non-visible defects, such as poor penetration, lack of fusion, porosity, inclusions, and cracks, in received audio of welding processes.

An exemplary use of the invention may involve the trained foundation model detecting visible but difficult-to-detect defects, such as underfilled, undercut, overlap, and excess reinforcement, in received audio of welding processes.

As previously described, metal-to-metal welding is a key component of consumer and industrial products. During the welding process, numerous defects can occur. The detection of welding defects is important for manufacturing companies, as a defect in one or more products can lead to costly product recalls. Detection of welding defects is primarily performed by human inspection of random samples on a product line. However, to increase efficiency, companies are turning to artificial intelligence ("AI")-based quality inspection to detect welding defects. Current methods attempt to build machine learning models to detect welding defects using large amounts of annotated or labeled audio data. However, audio data from welding defects can be very difficult to annotate and label due to the invisibility of the defects. Additionally, the annotating and labeling of the data to train the models can require a significant time investment. Thus, the use of audio in AI-based welding detection is limited and its effectiveness is hindered by the lack of annotated data for the majority of the welding defect types. Therefore, it may be likely that a considerable number of welding defects are not discovered during the manufacturing process and as a result, products comprising the welding defects are being sent out to consumers, unbeknownst to both the manufacturers and the consumers.

Thus, embodiments of the present invention may provide advantages including, but not limited to, performing self-supervised pretraining of a foundation model using audio data of welding processes, that requires no annotations or labels, and fine-tuning the model on a limited amount of labeled audio data of welding processes, in which the model can later be quickly deployed to detect all welding defects using audio data of welding processes, as opposed to current AI-based models that require a large amount of labeled data and cannot make use of any unlabeled data in any stage(s) of training. The present invention can introduce a notion of temporal-frequency multi-scale resolution into a random masking application, comprising increasing the signal-to-noise ratio by identifying regions of importance in the audio of the welding and inputting into the foundation model the higher-emphasized regions of welding audio together with coarse-grained Mel spectrograms of welding audio that comprise background noise or less important welding audio signals, which focuses learning on the "grammar" of the important regions of the Mel spectrograms, i.e., those regions of high signal, versus the regions of high noise, using both coarse-grained and fine-grained features. Coarse-grained features can comprise Mel spectrogram features that are computed using the standard Short-Time Fourier Transform ("STFT") parameters (hop length, window size, and number of Mel frequency bins), i.e., 128-dimensional log Mel filterbank ("fbank") features on the standard frequency range of 0-10 HZ to the Nyquist frequency, using a 25 ms Hann window every 10 ms. Fine-grained features can comprise higher resolution Mel spectrogram features that are 'zoomed-in' regions of important masked patches in the coarse-grained Mel spectrogram. The higher resolution Mel spectrogram can be computed with shorter hop lengths and smaller frequency ranges compared to standard STFT parameters while using the same or smaller window size and Mel frequency bins. The present invention can mask patches based on their learned importance scores, determined via an importance estimator, and use both unmasked and masked patches to train a foundation model. The present invention does not require that all advantages need to be incorporated into every embodiment of the invention.

According to at least one embodiment, unlabeled audio training data comprising recordings of welding processes can be received from one or more audio acquisition devices, such as a microphone. Audio data from welding processes can comprise sounds/noises produced by welding defects, indicated by frequencies and waveform in the audio of welding and made visible by specific regions in a Mel spectrogram. Welding defects may comprise visible defects, such as spatter and burn-through, non-visible defects, such as poor penetration, lack of fusion, porosity, inclusions, and cracks, or visible but difficult-to-detect defects, such as underfilled, undercut, overlap, and excess reinforcement.

According to at least one embodiment, the unlabeled and labeled audio data can be formatted. The program can transform uploaded audio data into a Mel spectrogram, comprising dimensions of 128×100 t when the Mel spectrogram is computing using standard STFT parameters, where 128 can represent the number of Mel frequency bins and t can represent an elapsed time in seconds, by converting the uploaded audio data into a frequency domain through STFT. The program can split a Mel spectrogram into smaller 2D patches. 2D patches can comprise a representation of the audio signal in both time and the frequency domain. The program can learn the importance scores for the 2D patches for both timeframe and frequency patches using unlabeled welding data by inputting the 2D patches of the Mel spectrogram into an importance estimator module. Higher importance scores can represent the importance of a representative patch, i.e., the higher the score, the more important the patch is. The program can mask the 2D patches of the Mel spectrogram at a certain percentage based on the importance scores. The program can generate an importance binary mask using the importance patch scores. By using the importance patch scores to generate the importance binary mask, the program can increase the likelihood that the important 2D patches will be masked. The program can apply masking to the Mel spectrogram to obtain a masked Mel spectrogram. Specifically, the program can generate a masked Mel spectrogram by applying the importance binary mask on the Mel spectrogram, i.e., by performing element-wise multiplication between the importance binary mask and the Mel spectrogram.

According to at least one embodiment, the program can introduce multi-resolution masking comprising both coarse-grained and fine-grained features. The masking can be defined to focus the grammar learning on important regions of the spectrograms, i.e., those regions of high signal versus the regions of high noise. The program can introduce a notion of temporal-frequency multi-scale resolution into the masking process itself to find and focus on the high signal regions of the Mel spectrogram. The program can perform masking on the fine-grained features by sending the masked Mel spectrogram and the importance patch scores into the G module. Function G can output the coarse-grained Mel spectrogram and the fine-grained Mel spectrograms. The coarse-grained masked spectrogram can comprise the input to the G module. The program can select the top-p highest scores based on the importance scores that were generated from the importance module. For patches in the coarse-grained Mel spectrogram corresponding to the top-p highest score, the zoomed-in Mel spectrogram of the patch region can be computed and denoted as top-p fine-grained Mel spectrograms. The program can apply random masking to the top-p fine-grained Mel spectrograms to create fine-grained masked Mel spectrograms.

According to at least one embodiment, a foundation model can be trained through self-supervision using the formatted unlabeled audio data, i.e., iterate minimizing the reconstruction loss of the foundation model during the pretraining phase. The program can employ a mean square error ("MSE") loss function as a type of reconstruction loss on the reconstructed 2D patches and the original unmasked 2D patches for only patch areas that are masked. By training the foundation model in a self-supervised manner, the program can learn the "grammar" of the welding audio. The grammar of the audio may comprise the subtleties of the effects of the welding defects. The subtleties can be identified, precisely defined by regions of signal versus noise, and used in the application of random masking of the fine-grained features. The program can input the coarse-grained masked Mel spectrogram and the fine-grained masked Mel spectrograms into the foundation model. The program can learn the global and local position embeddings by passing the coarse-grained Mel spectrograms and fine-grained Mel spectrograms through the foundation model. For coarse-grained features, the program may learn global position embedding, i.e., only global position embeddings are added to the patch embeddings. For fine-grained features, the program may learn both the global and local position embeddings, i.e., both global and local position embeddings are added to the patch embeddings. The transformer encoder can convert the patches of the Mel spectrograms to patch embeddings via a linear projection layer, also known as a patch embedding layer. The program can add trainable position embeddings to the patch embeddings to capture the spatial structure of the 2D Mel spectrograms. The transformer encoder can encode the patch tokens. The transformer decoder can process the encoded order-restored patch tokens and masked tokens to perform the Mel spectrogram reconstruction on the encoded masked tokens corresponding to the masked patches, thus, creating a reconstructed Mel spectrogram.

According to at least one embodiment, the program can perform fine-tuning with classification loss on a limited amount of formatted labeled welding audio data using the transformer encoder of the foundation model. The program can train the encoder with the classification loss function to classify each Mel spectrogram to one of the few classes, for example, welding defect one (1), welding defect two (2), normal welding process, or no welding occurring.

According to at least one embodiment, multi-resolution audio defect detection can be performed on welding audio data using the trained foundation model via coarse-grained and fine-grained Mel spectrograms. Welding audio data may comprise received audio data using one or more audio acquisition devices, such as a microphone. The program can format the received welding audio in much the same way as the program formats the training data as previously described. The program can input the formatted welding audio data into the trained foundation model to generate the welding audio defect results. The program can use the trained foundation model to dynamically process the received and formatted welding audio data to determine if there are any welding defects present in the audio data. The analysis can comprise determining if the welding audio data comprises one or more of the time-frequency feature representations with defective patterns that are learned during the training of the foundation model. Upon the determination that the welding audio data comprises one or more of the learned time-frequency feature representations with defective patterns, the program can output the class of the Mel spectrogram, thus, indicating the type of welding defect present in the welding audio data, welding defect one (1), presence of poor porosity. The program may update, for example, daily, the foundation model with analyzed welding audio data upon the collection and analysis of the welding audio data.

The present invention may be a system, a method, and/or a computer program product at any possible technical detail level of integration. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product for receiving unlabeled and labeled audio data, formatting the received unlabeled and labeled audio data, training a foundation model using the formatted unlabeled audio data in a self-supervised manner with a reconstruction loss, training the foundation model using the formatted labeled audio data with a classification loss, and performing multi-resolution audio defect detection on welding audio data using the trained foundation model.

Beginning now with FIG. 1, an exemplary networked computer environment 100 is depicted, according to at least one embodiment. Computing environment 100 contains an example of an environment for the execution of at least some of the computer code involved in performing the inventive methods, such as welding audio defect detection determination code 200, otherwise referred to as "welding audio defect detection determination program", or "the program". In addition to code block 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer, or any other form of computer or mobile device now known or to be developed in the future that is capable of running an algorithm, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 200, in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 200, typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), beacon connections (for example, location-based services (LBS)), virtual beacon connections, connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. In various embodiments, UI device set 123 may comprise one or more audio acquisition devices 123 and one or more video acquisition devices 123. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as application-specific integrated circuits ("ASICs"), copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on. Additionally, EUD 103 may comprise a guardian device.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs, and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The database 130 may be a digital repository capable of data storage and data retrieval. The database 130 can be present in the remote server 104 and/or any other location in the network 102. The database 130 can comprise machine learning models, such as the foundation model 604, as well as the training data used to train the machine learning models. Additionally, the database 130 can comprise received and analyzed welding audio data.

According to the present embodiment, the welding audio defect detection determination program 200 may be a program capable of receiving training data, formatting the received training data, training a foundation model using the formatted unlabeled training data in a self-supervised manner with reconstruction loss, training the foundation model using a limited amount of formatted labeled training data with classification loss, and performing multi-resolution audio defect detection on welding audio data using the trained foundation model. The program 200 may be located on client computing device 101 or remote server 104 or on any other device located within network 102. Furthermore, the program 200 may be distributed in its operation over multiple devices, such as client computing device 101 and remote server 104. The welding audio defect detection determination method is explained in further detail below with respect to FIG. 2.

Figure 2:
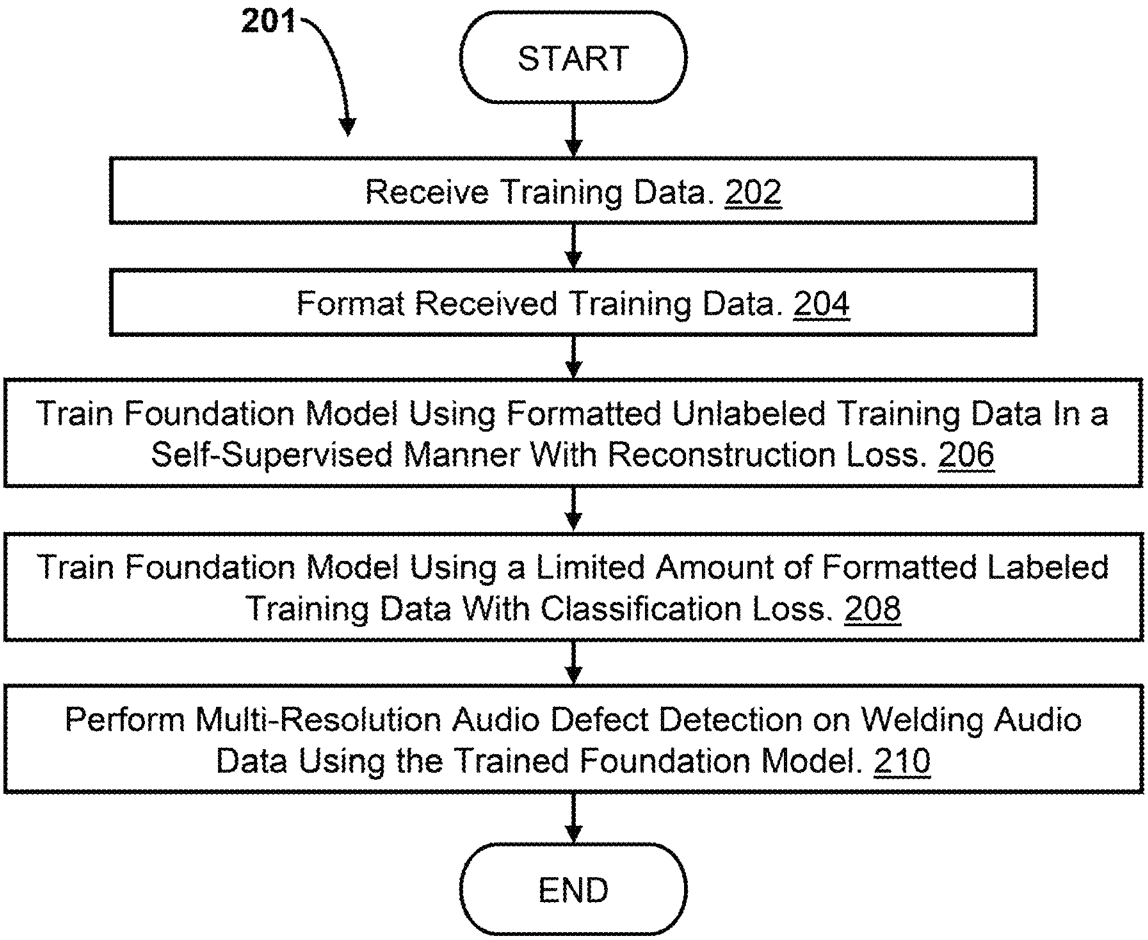
FIG. 2 is an operational flowchart illustrating a welding audio defect detection determination process according to at least one embodiment.
Figure 7:
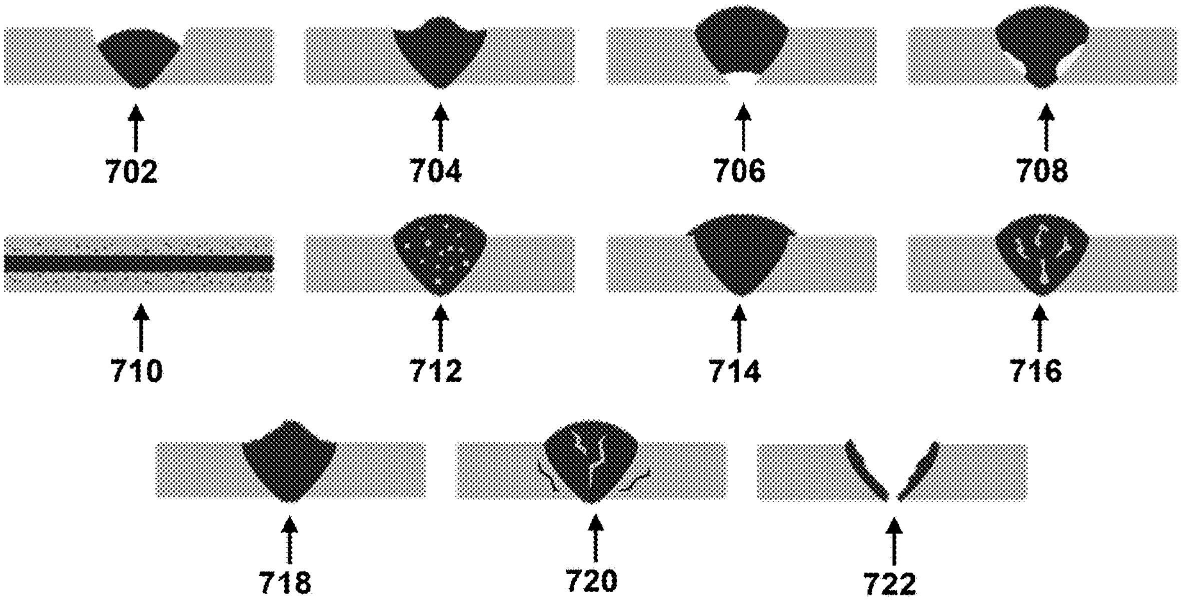
FIG. 7 is an illustration of the primary types of welding defects according to at least one embodiment.

FIG. 2 is an operational flowchart illustrating a welding audio defect detection determination process 201 according to at least one embodiment. At 202, the program 200 receives training data from one or more audio acquisition devices 123, such as a microphone. Training data may comprise unlabeled and labeled audio data used to train a machine learning model(s), such as a foundation model 604. The foundation model 604 can be quickly deployed to detect all welding defects after using audio data of welding processes, which requires no annotating or labeling of the data, during the pretraining phase, followed by a fine-tuning phase with a limited amount of labeled audio data. Training data can be uploaded to the program 200, such as audio recordings of welding processes, captured using one or more audio acquisition devices 123, or video recordings, captured using one or more video acquisition devices 123, such as a camera, of welding processes comprising audio, captured using one or more audio acquisition devices 123. As previously stated, audio data from welding processes can comprise sounds/noises produced by welding defects, indicated by frequencies and waveform in the audio of welding and made visible by specific regions in a Mel spectrogram. Welding defects may comprise visible defects, such as spatter 710 (FIG. 7) and burn-through 722 (FIG. 7), non-visible defects, such as poor penetration 706 (FIG. 7), lack of fusion 708 (FIG. 7), porosity 712 (FIG. 7), inclusions 716 (FIG. 7), and cracks 720 (FIG. 7), or visible but difficult-to-detect defects, such as underfilled 702 (FIG. 7), undercut 704 (FIG. 7), overlap 714 (FIG. 7), and excess reinforcement 718 (FIG. 7).

Figure 3:
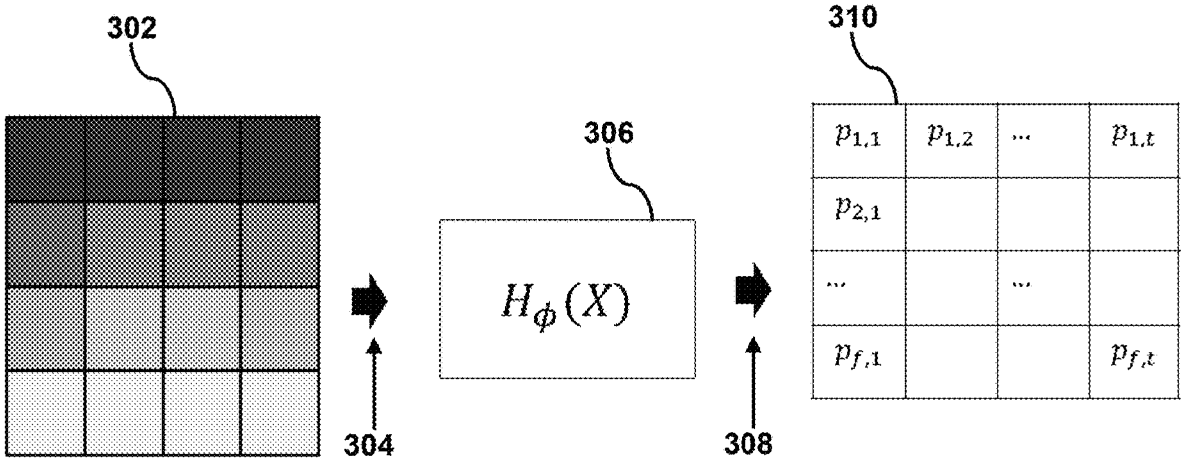
FIG. 3 is an illustration of the learning of importance scores for the 2D patches portion of the welding audio defect detection determination process according to at least one embodiment.

At 204, the program 200 formats the received training data. The program 200 can transform uploaded audio data into a Mel spectrogram 302 (FIG. 3) by converting the uploaded audio data into a time-frequency domain, for example, equal lengths of t=1 second, through Short-Time Fourier Transform, during which the time-domain segments are overlapped with one another. The program 200 can perform Fourier Transform over overlapping windowed segments of audio by specifying the type of window, the window length, and the hop length, which comprises the non-intersecting portion of window length, i.e., through a Mel-scale filter bank, to obtain a Mel spectrogram 302. A Mel spectrogram 302 may comprise a dimension of 128×100 t when computed using the standard STFT parameters. The program 200 can split a Mel spectrogram 302 into 2D patches. As previously stated, 2D patches can comprise a representation of the audio signal in both time and the frequency domain.

The program 200 can learn the importance scores 310 (FIG. 3) for the 2D patches using an importance estimator module 306 (FIG. 3) for both timeframe and frequency patches using unlabeled welding data. As previously stated, the quantity of an importance patch score 310 can represent how important the representative patch is, i.e., the higher the score, the more important the patch is. The program 200 can input 304 (FIG. 3) the 2D patches of the Mel spectrogram 302 into the importance estimator module 306, $H_\phi(\bullet)$. The importance estimator module 306 can output 308 (FIG. 3) the importance patch scores. Specifically, the importance patch scores 310, ρ, for the 2D patches can be obtained by:

$$\rho = \sigma(H_\phi(X)), \text{ where } p \in \mathbb{R}^{f \times t}$$

The learnable parameters can be represented by ϕ. The importance estimation module can be represented by $H_\phi(\bullet)$. $X \in \mathbb{R}^{F \times T}$ can be the Mel spectrogram 302 input. The sigmoid function can be represented by σ.

$$f \text{ can be } \frac{P}{patchsize}.$$

$$t \text{ can be } \frac{T}{patchsize}.$$

Figure 4:
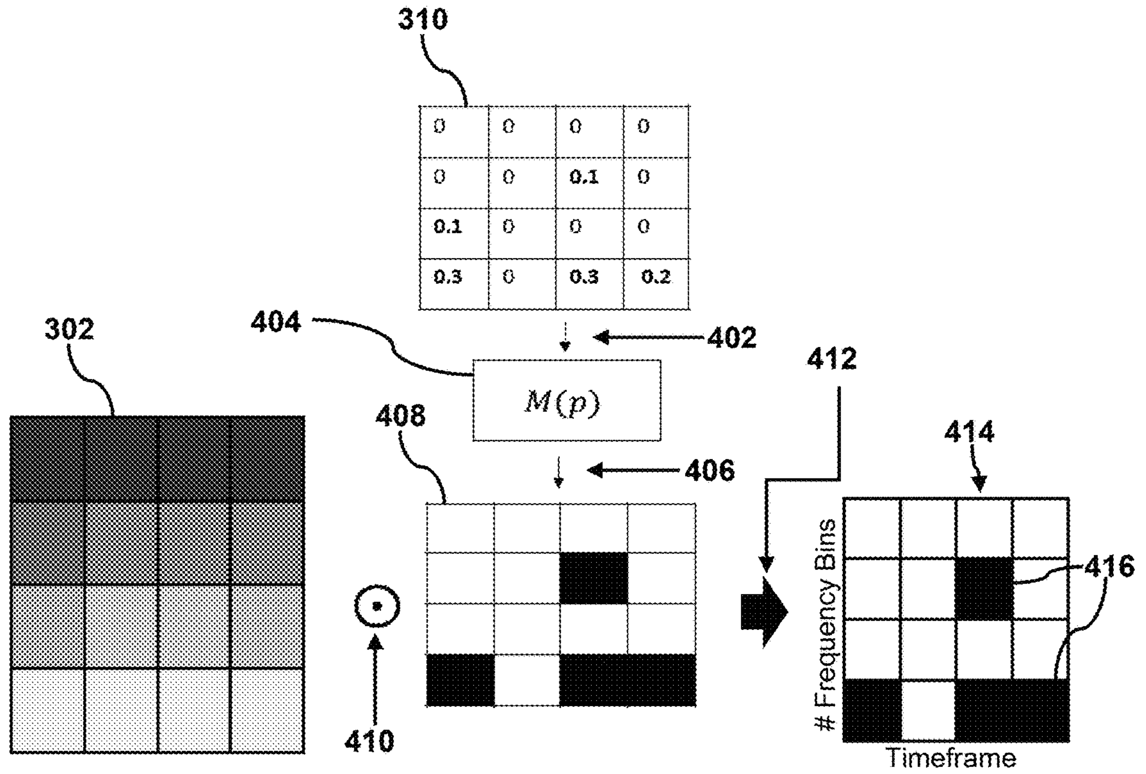
FIG. 4 is an illustration of masking using importance scores portion of the welding audio defect detection determination process according to at least one embodiment.

The program 200 can randomly mask the 2D patches of the Mel spectrogram 302. In at least one embodiment, the program 200 may apply random masking to the 2D patches at a chosen percentage. In at least one embodiment, the program 200 may apply importance masking based on the importance patch scores 310, ρ, to the 2D patches at a chosen percentage. The program 200 can generate an importance binary mask 408 (FIG. 4) by inputting 402 (FIG. 4) the importance patch scores 310, p, into the M(p) module 404 (FIG. 4). The M(p) module 404 can output 406 (FIG. 4) the importance binary mask 408. By using the importance patch scores 310, p, to generate the importance binary mask 408, the program 200 can increase the likelihood that the important 2D patches will be masked. The program 200 can apply importance masking to the Mel spectrogram 302, X, to obtain a masked Mel spectrogram 414 (FIG. 4), $X^{mask}$. The masked Mel spectrogram 414 may comprise masked 2D patches 416 (FIG. 4) as well as unmasked 2D patches. Specifically, the program 200 can generate 412 (FIG. 4) a masked Mel spectrogram 414, $X^{mask}$, by applying 410 (FIG. 4) the importance binary mask 408 on the Mel spectrogram 302, X, i.e., by performing element-wise multiplication 410 between the importance binary mask 408 and the Mel spectrogram 302, X.

Figure 5:
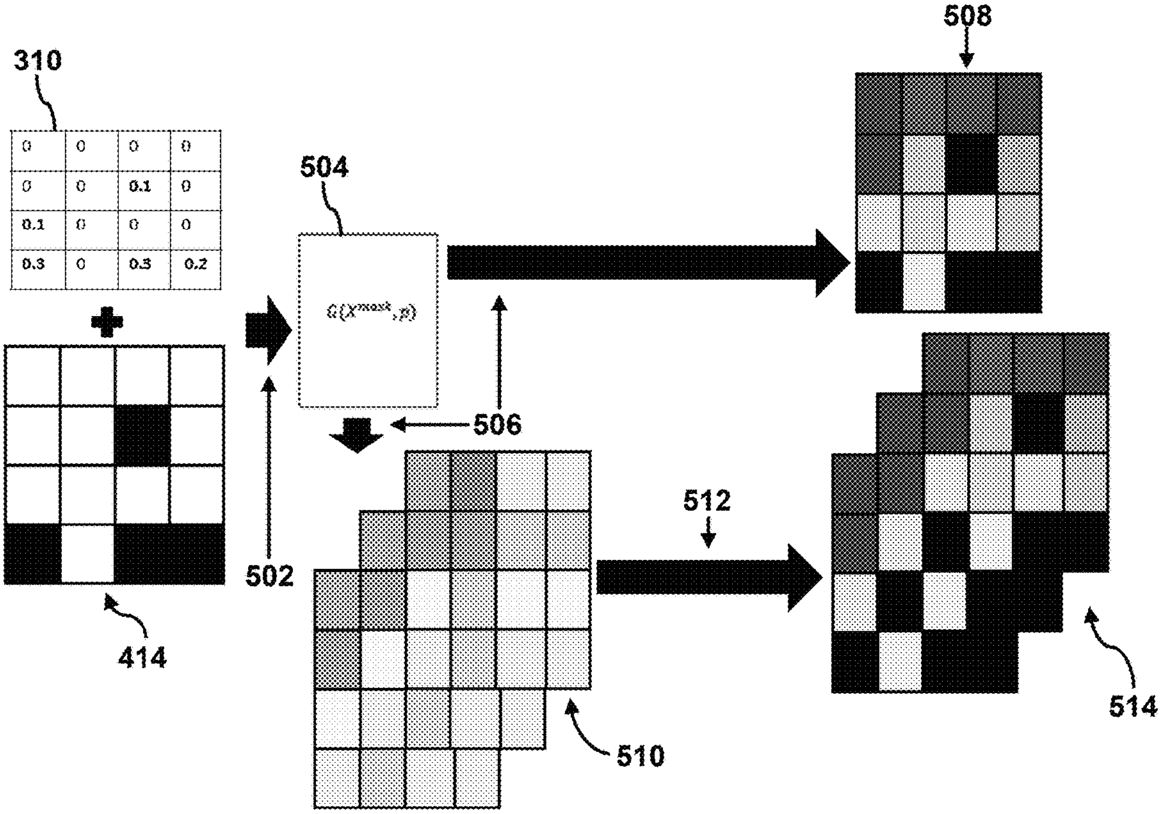
FIG. 5 is an illustration of the coarse-grained and fine-grained masking portion of the welding audio defect detection determination process according to at least one embodiment.

The program 200 can introduce multi-resolution masking comprising both coarse-grained and fine-grained features. As previously stated, coarse-grained features can comprise Mel spectrogram features that are computed using the standard Short-Time Fourier Transform ("STFT") parameters (hop length, window size, and number of Mel frequency bins), i.e., 128-dimensional log Mel filterbank ("fbank") features on the standard frequency range of 0-10 HZ to the Nyquist frequency, using a 25 ms Hann window every 10 ms. Fine-grained features can comprise higher resolution Mel spectrogram features that are 'zoomed-in' regions of important masked patches in the coarse-grained Mel spectrogram 508 (FIG. 5). The masking can be defined as focusing the grammar learning on important regions of the spectrograms, i.e., those regions of high signal versus the regions of high noise. The program 200 can introduce a notion of temporal-frequency multi-scale resolution, comprising increasing the signal-to-noise ratio by identifying regions of importance in the audio of the welding and inputting into the foundation model 604 the higher-emphasized regions of the welding audio together with coarse-grained Mel-spectrograms of welding audio that comprise background noise or less important welding audio signals, into the masking process itself to find and focus on the high signal regions of the Mel spectrogram 302. The program 200 can perform masking on the fine-grained features by inputting 502 (FIG. 5) the masked Mel spectrogram 414 and the importance patch scores 310, ρ, into the $G(X^{mask}, p)$ module 504 (FIG. 5). Function $G(X^{mask}, p)$ 504 can output 506 (FIG. 5) the coarse-grained Mel spectrogram 508, $X^{mask}$, and the top-p fine-grained Mel spectrograms 510 (FIG. 5), $$T_{finegrain}(X_{i,j}^{mask}).$$

The coarse-grained masked spectrogram 508, $X^{mask}$, can have a dimension of 128×100 t. The coarse-grained masked spectrogram 508, $X^{mask}$, can comprise the input to the $G(X^{mask}, p)$ module 504. The program 200 can select the top—p highest scores based on the importance patch scores 310, p, that were generated from the importance module $H_{\phi}(\cdot)$ 306. For $$X_{i,j}^{mask}$$

patches corresponding to the top-p highest score, the zoomed-in Mel spectrograms 510, also referred to as higher resolution Mel spectrograms 510, of the patch region can be computed and denoted as top-p fine-grained Mel spectrograms 510. For each top-p 2D-patch (i, j):

$$G(X_{i,j}^{mask}, p_{i,j}) = \begin{cases} T_{finegrain}(X_{i,j}^{mask}), & \text{if } p_{i,j} \text{ score in top} - p \\ X_{i,j}^{mask}, & \text{otherwise} \end{cases}$$

The top-p fine-grained Mel spectrograms 510

$$T_{finegrain}(X_{i,j}^{mask})$$

can have the same dimensions as X 302 and $X^{mask}$ 414, 508, i.e., 128×100 t. The top-p Mel spectrogram 510 can be computed with shorter hop lengths and smaller frequency ranges compared to standard STFT parameters while using the same or smaller window size and Mel frequency bins. Specifically, the program 200 can create zoomed-in Mel spectrograms 510 of 2D patches using the $T_{finegrain}(\bullet)$ function. The program 200 may retain the time dimension of 100*t* for the patch of interest by decreasing the hop length over the time interval of interest. The program 200 may retain the frequency dimension of 128 Mel bins for the patch of interest by mapping the Mel frequency back to frequency, determining the frequency range of interest, transforming the frequency to Mel frequency scale, and binning into 128 bins. The program 200 can apply 512 (FIG. 5) random masking to the top-p fine-grained Mel spectrograms 510 to create fine-grained masked spectrograms 514 (FIG. 5), comprising the dimensions of 128×100 t.

Figure 6:
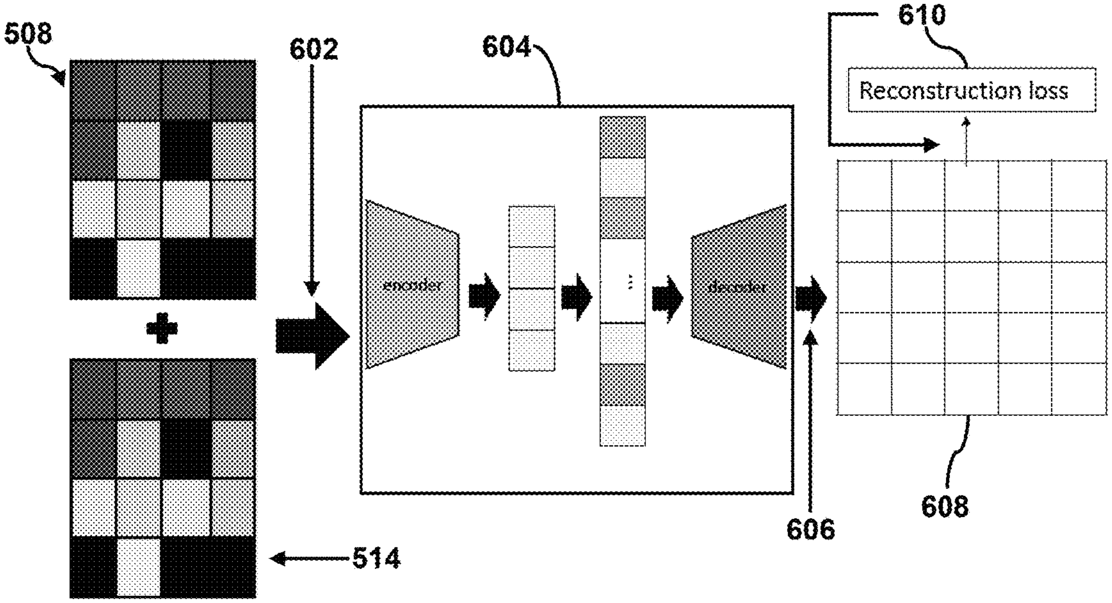
FIG. 6 is an illustration of the foundation model pretraining portion of the welding audio defect detection determination process according to at least one embodiment.

At 206, the program 200 trains a foundation model 604 (FIG. 6) using formatted unlabeled training data through self-supervision learning with reconstruction loss, i.e., iterate minimizing the reconstruction loss 610 (FIG. 6) of the foundation model 604 during the pretraining phase. The program 200 can employ a mean square error loss function as a type of reconstruction loss 610 on the reconstructed 2D patches and the original unmasked 2D patches for only patch areas that are masked. As previously stated, by training the foundation model 604 in a self-supervised manner, the program 200 can learn the "grammar" of the welding audio. The grammar of the audio may comprise the subtleties of the effects of the welding defects. The subtleties can be identified, precisely defined by regions of signal versus noise, and used in the application of random masking of the fine-grained features. The program 200 can input 602 (FIG. 6) the coarse-grained masked Mel spectrogram 508 and the fine-grained masked Mel spectrograms 514 into the foundation model 604. The foundation model 604 can comprise a transformer encoder and a transformer decoder. The transformer encoder may comprise a learnable linear projection layer and a number of stacked transformer blocks. The decoder may comprise a linear projection layer and a number of layers of transformer blocks. The transformer encoder can convert the patches of the Mel spectrograms 508, 514, to patch embeddings via a linear projection layer, also known as a patch embedding layer. The program 200 can add trainable position embeddings to the patch embeddings to capture the spatial structure of the 2D Mel spectrograms. The program 200 can learn the global and local position embeddings by passing the coarse-grained Mel spectrograms 508 and fine-grained Mel spectrograms 514 through the foundation model 604. For coarse-grained features, the program 200 may learn global position embedding, i.e., only global position embeddings are added to the patch embeddings. For fine-grained features, the program 200 may learn both the global and local position embeddings. i.e., both global and local position embeddings are added to the patch embeddings. The transformer encoder can encode the patch tokens. The transformer decoder can process the encoded order-restored patch tokens and masked tokens to perform 606 (FIG. 6) the Mel spectrogram reconstruction on the encoded masked tokens corresponding to the masked patches, thus, creating a reconstructed Mel spectrogram 608 (FIG. 6) with dimensions of 128×100 t.

At 208, the program 200 trains the foundation model 604 using a limited amount of formatted labeled training data with a classification loss. As previously stated, the program 200 can perform fine-tuning on a small amount of labeled welding audio data using the transformer encoder of the foundation model 604. The program 200 can train the encoder with the classification loss function to classify each Mel spectrogram, to one of the few classes, for example, welding defect one (1), welding defect two (2), normal welding process, or no welding occurring.

At 210, the program 200 performs multi-resolution audio defect detection on welding audio data using the trained foundation model 604 via coarse-grained 508 and fine-grained 514 Mel spectrograms. As previously stated, welding audio data may comprise received audio data using one or more audio acquisition devices 123, such as a microphone. The program 200 can format the received welding audio in much the same way as the program 200 formats the training data as described in step 204. The program 200 can input the formatted welding audio data into the trained foundation model 604 to generate the welding audio defect results. The program 200 can use the trained foundation model 604 to dynamically process the received and formatted welding audio data to determine if there are any welding defects present in the audio data. The analysis can comprise determining if the welding audio data comprises one or more of the time-frequency feature representations with defective patterns that are learned during the training of the foundation model 604. Upon the determination that the welding audio data comprises one or more of the learned time-frequency feature representations with defective patterns, the program 200 can output the class of the Mel spectrogram, thus, indicating the type of welding defect present in the welding audio data, welding defect one (1), presence of poor porosity. The program 200 may update, for example, daily, the foundation model 604 with analyzed welding audio data upon the collection and analysis of the welding audio data. The analyzed welding audio data may be stored in the database 130.

It may be appreciated that FIGS. 2 through 7 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for multi-resolution audio defect detection in welding, the method comprising:

receiving unlabeled and labeled audio data recorded from welding processes;

formatting the received unlabeled and labeled audio data, wherein the formatting comprises:

transforming the labeled and unlabeled audio data into a Mel spectrogram;

splitting the Mel spectrogram into 2D patches;

learning importance scores for the 2D patches based on the unlabeled audio data;

generating a coarse-grained masked Mel spectrogram, wherein the generating the coarse-grained masked Mel spectrogram comprises masking at least one of the 2D patches based on the learned importance scores; and masking a set of fine-grained Mel spectrograms selected from the coarse-grained masked Mel spectrogram based on the learned importance scores to obtain fine-grained masked Mel spectrograms;

pretraining a foundation model using the formatted unlabeled audio data in a self-supervised manner with a reconstruction loss;

fine-tuning the pretrained foundation model using the formatted labeled audio data with a classification loss to obtain a trained foundation model;

formatting new welding audio data recorded from a welding process; and performing multi-resolution audio defect detection on the formatted new welding audio data using the trained foundation model.

2. The method of claim 1, wherein the 2D patches comprise timeframe and frequency patches of the unlabeled audio data, and wherein the generating the coarse-grained masked Mel spectrogram further comprises masking one or more of the 2D patches randomly.

3. The method of claim 1, wherein the formatting of the new audio data comprises generating both coarse-grained Mel spectrograms and fine-grained Mel spectrograms for the new audio data.

4. The method of claim 1, wherein the performing of the multi-resolution audio defect detection on the formatted new welding audio data using the trained foundation model comprises determining if one or more welding defects are present in the formatted new welding audio data.

5. The method of claim 1, wherein the formatting of the received unlabeled and labeled audio data further comprises generating an importance binary mask using the learned importance scores and applying the importance binary mask on the Mel spectrogram to obtain the coarse-grained masked Mel spectrogram.

6. The method of claim 1, wherein the formatting of the received unlabeled and labeled audio data further comprises randomly masking at least one fine-grained Mel spectrogram selected from the coarse-grained masked Mel spectrogram.

7. The method of claim 1, further comprising, in response to the multi-resolution audio defect detection resulting in detecting a welding defect, outputting a class of Mel spectrogram indicating a type of the welding defect.

8. The method of claim 1, further comprising learning global position embeddings for features from the coarse-grained masked Mel spectrogram and both global and local position embeddings for features from the fine-grained masked Mel spectrograms.

9. The method of claim 1, further comprising, in response to the multi-resolution audio defect detection resulting in detecting a welding defect, automatically triggering a corrective action.

10. A computer system for multi-resolution audio defect detection in welding, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving unlabeled and labeled audio data recorded from welding processes;

formatting the received unlabeled and labeled audio data, wherein the formatting comprises:

transforming the labeled and unlabeled audio data into a Mel spectrogram;

splitting the Mel spectrogram into 2D patches;

learning importance scores for the 2D patches based on the unlabeled audio data;

generating a coarse-grained masked Mel spectrogram, wherein the generating the coarse-grained masked Mel spectrogram comprises masking at least one of the 2D patches based on the learned importance scores; and masking a set of fine-grained Mel spectrograms selected from the coarse-grained masked Mel spectrogram based on the learned importance scores to obtain fine-grained masked Mel spectrograms;

pretraining a foundation model using the formatted unlabeled audio data in a self-supervised manner with a reconstruction loss;

fine-tuning the pretrained foundation model using the formatted labeled audio data with a classification loss to obtain a trained foundation model;

formatting new welding audio data recorded from a welding process; and performing multi-resolution audio defect detection on the formatted new welding audio data using the trained foundation model.

11. The computer system of claim 10, wherein the 2D patches comprise timeframe and frequency patches of the unlabeled audio data, and wherein the generating the coarse-grained masked Mel spectrogram further comprises masking one or more of the 2D patches randomly.

12. The computer system of claim 10, wherein the formatting of the new audio data comprises generating both coarse-grained Mel spectrograms and fine-grained Mel spectrograms for the new audio data.

13. The computer system of claim 10, wherein the performing of the multi-resolution audio defect detection on the formatted new welding audio data using the trained foundation model comprises determining if one or more welding defects are present in the formatted new welding audio data.

14. The computer system of claim 10, wherein the formatting of the received unlabeled and labeled audio data further comprises generating an importance binary mask using the learned importance scores and applying the importance binary mask on the Mel spectrogram to obtain the coarse-grained masked Mel spectrogram.

15. The computer system of claim 10, wherein the formatting of the received audio data further comprises randomly masking at least one fine-grained Mel spectrogram selected from the coarse-grained masked Mel spectrogram.

16. A computer program product for multi-resolution audio defect detection in welding, the computer program product comprising:

one or more computer-readable tangible storage medium and program instructions stored on at least one of the one or more tangible storage medium, the program instructions executable by a processor to cause the processor to perform a method comprising:

receiving unlabeled and labeled audio data recorded from welding processes;

formatting the received unlabeled and labeled audio data, wherein the formatting comprises:

transforming the labeled and unlabeled audio data into a Mel spectrogram;

splitting the Mel spectrogram into 2D patches:

learning importance scores for the 2D patches based on the unlabeled audio data;

generating a coarse-grained masked Mel spectrogram, wherein the generating the coarse-grained masked Mel spectrogram comprises masking at least one of the 2D patches based on the learned importance scores; and masking a set of fine-grained Mel spectrograms selected from the coarse-grained masked Mel spectrogram based on the learned importance scores to obtain fine-grained masked Mel spectrograms;

pretraining a foundation model using the formatted unlabeled audio data in a self-supervised manner with a reconstruction loss;

fine-tuning the pretrained foundation model using the formatted labeled audio data with a classification loss to obtain a trained foundation model;

formatting new welding audio data recorded from a welding process; and performing multi-resolution audio defect detection on the formatted new welding audio data using the trained foundation model.

17. The computer program product of claim 16, wherein the 2D patches comprise timeframe and frequency patches of the unlabeled audio data, and wherein the generating the coarse-grained masked Mel spectrogram further comprises masking one or more of the 2D patches randomly.

18. The computer program product of claim 17, wherein the formatting of the received unlabeled and labeled audio data further comprises generating an importance binary mask using the learned importance scores and applying the importance binary mask on the Mel spectrogram to obtain the coarse-grained masked Mel spectrogram.

19. The computer program product of claim 16, wherein the formatting of the new welding audio data comprises generating both coarse-grained Mel spectrograms and fine-grained Mel spectrograms for the new welding audio data.

20. The computer program product of claim 16, wherein the performing of the multi-resolution audio defect detection on the formatted new welding audio data using the trained foundation model comprises determining if one or more welding defects are present in the formatted new welding audio data.

* * * * *